US011397600B2

(12) United States Patent
Secomandi et al.

(10) Patent No.: US 11,397,600 B2
(45) Date of Patent: Jul. 26, 2022

(54) DYNAMIC CATALOG TRANSLATION SYSTEM

(71) Applicant: HCL Technologies Italy S.p.A, Vimodrone (IT)

(72) Inventors: Antonio Secomandi, Rome (IT); Viviana Tripodi, Rome (IT); Matteo Santangeli, Rome (IT)

(73) Assignee: HCL Technologies Italy S.p.A, Milan (IT)

( * ) Notice: Subject to any disclaimer, the term of this patent is extended or adjusted under 35 U.S.C. 154(b) by 266 days.

(21) Appl. No.: 16/420,382

(22) Filed: May 23, 2019

(65) Prior Publication Data

US 2020/0371824 A1 Nov. 26, 2020

(51) Int. Cl.
*G06F 9/451* (2018.01)
*G06F 40/58* (2020.01)
*G06F 40/263* (2020.01)

(52) U.S. Cl.
CPC ............ *G06F 9/454* (2018.02); *G06F 40/263* (2020.01); *G06F 40/58* (2020.01)

(58) Field of Classification Search
CPC ......... G06F 17/30; G06F 17/289; G10L 21/60
See application file for complete search history.

(56) References Cited

U.S. PATENT DOCUMENTS

| | | | |
|---|---|---|---|
| 6,980,953 B1 | 12/2005 | Kanevsky et al. | |
| 7,139,696 B2* | 11/2006 | Tokieda | G06F 40/58 704/8 |
| 7,584,216 B2* | 9/2009 | Travieso | G06F 40/143 |
| 7,730,109 B2* | 6/2010 | Rohrs | G06F 16/958 707/803 |
| 7,784,026 B1* | 8/2010 | Wong | G06F 9/454 717/109 |
| 9,703,777 B2* | 7/2017 | Han | G06F 40/58 |
| 10,229,115 B2* | 3/2019 | Li | G06F 40/117 |
| 10,275,266 B1* | 4/2019 | Bhavineni | G06F 9/454 |
| 2001/0029455 A1* | 10/2001 | Chin | G06F 40/58 704/277 |
| 2003/0084401 A1* | 5/2003 | Abel | G06F 16/9535 715/205 |
| 2004/0260532 A1* | 12/2004 | Richardson | G06F 40/47 704/2 |
| 2005/0227768 A1* | 10/2005 | Blackburn | G06F 40/58 463/42 |

(Continued)

*Primary Examiner* — Anne L Thomas-Homescu
(74) *Attorney, Agent, or Firm* — Kendal Sheets (57) ABSTRACT

The present disclosure relates to a dynamic catalog translation system (DCTS) for internationalization of an application in a cloud environment. The DCTS may comprise receiving a catalog, associated with the application, in a first language from a developer device. The DCTS may further comprise receiving a request for the catalog in a second language from a user device running the application. Further, the DCTS may comprise dynamically generating the catalog in the second language in response to the received request from the user. The catalog is generated in a real-time or a near real-time of running the application at the user device. Furthermore, the DCTS may comprise communicating the generated catalog in the second language to the user device so that the application is configured to execute at the user device in the second language.

19 Claims, 4 Drawing Sheets

(56) References Cited

U.S. PATENT DOCUMENTS

| | | | |
|---|---|---|---|
| 2007/0233460 A1* | 10/2007 | Lancaster | G06F 40/47 704/9 |
| 2007/0294076 A1* | 12/2007 | Shore | G06F 40/58 704/2 |
| 2008/0262828 A1* | 10/2008 | Och | G06F 40/44 704/3 |
| 2009/0132232 A1* | 5/2009 | Trefler | H04L 67/02 704/2 |
| 2009/0287671 A1* | 11/2009 | Bennett | G06F 16/951 |
| 2012/0116751 A1* | 5/2012 | Bernardini | G06F 40/51 704/3 |
| 2013/0124186 A1* | 5/2013 | Donabedian | H04L 67/025 704/2 |
| 2014/0201187 A1* | 7/2014 | Larson | G06F 16/31 707/711 |
| 2015/0199337 A1* | 7/2015 | Park | G06F 40/58 704/2 |
| 2016/0019205 A1* | 1/2016 | Kidwai | G06F 40/47 704/7 |
| 2016/0162478 A1* | 6/2016 | Blassin | G06Q 10/06311 706/12 |
| 2016/0191448 A1* | 6/2016 | Eck | H04L 51/32 709/206 |
| 2017/0139904 A1* | 5/2017 | Dakss | G06F 40/58 |
| 2017/0169014 A1* | 6/2017 | Sotelo | G06Q 30/06 |
| 2017/0322944 A1* | 11/2017 | Farr | H04L 67/303 |
| 2018/0039622 A1* | 2/2018 | Bihani | G06F 40/58 |
| 2018/0067926 A1* | 3/2018 | Bestfleisch | G06F 9/454 |
| 2019/0056961 A1* | 2/2019 | Dimov | G06F 16/951 |
| 2019/0087415 A1* | 3/2019 | Scharnbacher | G06F 9/547 |
| 2019/0272296 A1* | 9/2019 | Prakash | G06F 16/243 |
| 2019/0317763 A1* | 10/2019 | Sakamoto | G06F 9/3004 |
| 2019/0347332 A1* | 11/2019 | Hiraoka | H04W 4/08 |
| 2020/0065228 A1* | 2/2020 | Liu | G06F 11/3636 |
| 2020/0066254 A1* | 2/2020 | Hiroe | G10L 13/086 |
| 2020/0279021 A1* | 9/2020 | Brandall | G06F 40/166 |

* cited by examiner

DYNAMIC CATALOG TRANSLATION SYSTEM

CROSS-REFERENCE TO RELATED APPLICATIONS AND PRIORITY

The present application does not claim priority from any patent application.

TECHNICAL FIELD

The present disclosure in general relates to the field of dynamic catalog translation system. More particularly, the present invention relates to a dynamic catalog translation system for internationalization of an application in a cloud environment.

BACKGROUND

Now a day, internationalization of commercial software has had a huge impact in a globalized market. Currently, cloud computing poses new challenges to the internationalization. In this case, a solution that is offered in a cloud offering has the potential to reach customers in every part of the world. It is to be noted that software development organizations and single freelance smartphone application developers leverage a set of well-established procedures and mechanisms to provide an internationalized version of their products. Currently, the mechanism used to provide internationalized content is based on a set of catalogs that hold the translated content, and a set of programming API that provide the selection of the desired messages based on the selected locale. However, the mechanism is very expensive and complicated as every time it takes several iterations before a stabilized version of the catalog can be collected.

SUMMARY

Before the present a dynamic catalog translation system is described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to the dynamic catalog translation system. This summary is not intended to identify essential features of the claimed subject matter nor is it intended for use in determining or limiting the scope of the claimed subject matter.

In one implementation, a method in a dynamic catalog translation system (DCTS) for internationalization of an application in a cloud environment is disclosed. In one embodiment, the method may comprise receiving a catalog in a first language from a developer device. The catalog may be associated with an application. The method may further comprise receiving a request for the catalog in a second language from a user device running the application. Further, the method may comprise dynamically generating the catalog in the second language in response to the received request from the user device. The catalog may be generated in a real-time or a near real-time of running the application at the user device. Furthermore, the method may comprise communicating the generated catalog in the second language to the user device.

In another implementation, a dynamic catalog translation system for internationalization of an application in a cloud environment is disclosed. In one embodiment, the dynamic catalog translation system may comprise a receiving unit. The receiving unit may be configured to receive a catalog in a first language from a developer device. The catalog may be associated with an application. Further, the receiving unit may receive a request for the catalog in a second language from a user device running the application. The dynamic catalog translation system may comprise a processing unit communicatively coupled to the receiver unit and configured to dynamically generate the catalog in the second language in response to the received request from the user. The catalog may be generated in a real-time or a near real-time of running the application at the user device. Further, the dynamic catalog translation system may comprise a transmitting unit communicatively coupled to the translating unit and configured to communicate the generated catalog in the second language to the user device.

In yet another implementation, a method for internationalization of an application in a cloud environment is disclosed. In one embodiment the method may comprise generating, by a developer device, an application and a catalog in a first language. The catalog may be associated with the application. The method may further comprise receiving, by a dynamic catalog translation system, the catalog in the first language from the developer device. Further, the method may comprise receiving, by the dynamic catalog translation system, a request for the catalog in a second language from a user device running the application. Furthermore, the method may comprise dynamically generating, by the dynamic catalog translation system, the catalog in the second language in response to the received request from the user. The catalog may be generated in a real-time or a near real-time of running the application at the user device. Further, the method may comprise communicating, by the dynamic catalog translation system, the generated catalog in the second language to the user device. The method may further comprise executing, by the user device, the application in the second language based on the catalog. Further, the method may comprise determining, by a user of the user device, a wrong translation of at least one message of the catalog in the second language when running the application in the second language. Furthermore, the method may comprise updating, by the user device, a corrected translation of at least one message of the catalog. The method may further comprise communicating, by the user device, the corrected translation of at least one message of the catalog to the dynamic catalog translation system. Further, the method may comprise updating, by the dynamic catalog translation system, a global catalog in the second language with the corrected translation of at least one message.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of the present disclosure, illustrating all its features, will now be discussed in detail. The words "receiving", "generating", "determining", "identifying", "communicating" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, a dynamic catalog translation system is now described. The disclosed embodiments of the dynamic catalog translation system are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for dynamic catalog translation system is not intended to be limited to the embodiments illustrated, but is to be accorded the widest scope consistent with the principles and features described herein.

The present subject matter relates to dynamic catalog translation system. In one embodiment, a catalog in a first language may be received from a developer device. The catalog may be associated with an application. Further, a request for the catalog in a second language may be received. The request may be received from a user device. Upon receiving the request, the catalog may be dynamically generated in the second language. The catalog may be generated in real-time or near real-time of running the application at the user device. The catalog may be further communicated to the user device. The application may be configured to execute at the user device in the second language.

Figure 1:
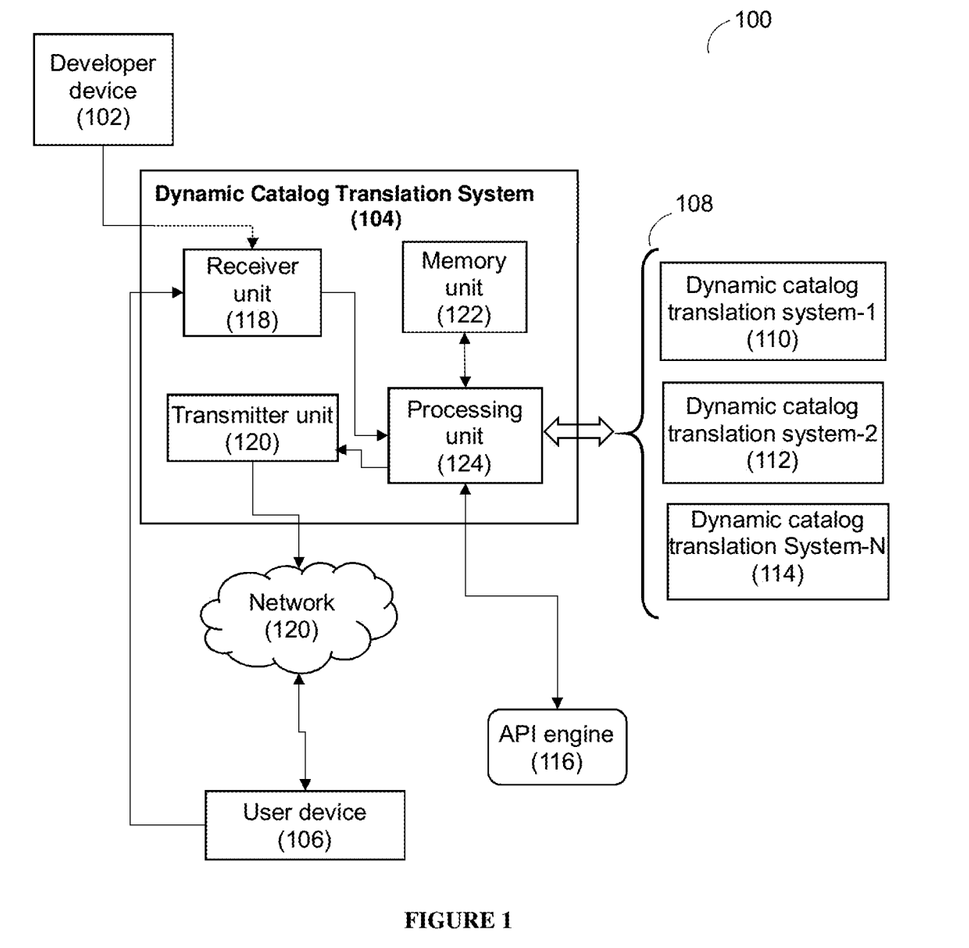
FIG. 1 illustrates an implementation 100 of a dynamic catalog translation system (DCTS) 104, in accordance with an embodiment of the present subject matter.

Referring now to FIG. 1, an implementation 100 of a dynamic catalog translation system (DCTS) 104 is illustrated in accordance with the present subject matter. Although the present subject matter is explained considering that the DCTS 104 is implemented on a server, it may be understood that the DCTS 104 may also be implemented in a variety of computing systems, such as a laptop computer, a desktop computer, a notebook, a workstation, a mainframe computer, a server, a network server, and the like. In one implementation, the DCTS 104 may be implemented over a cloud network. Further, it will be understood that the DCTS 104 may be accessed by multiple users through one or more user devices referred to as user device 106 hereinafter, or applications residing on the user device 106. Examples of the user device 106 may include, but are not limited to, a portable computer, a personal digital assistant, a handheld device, and a workstation. The user device 106 may be communicatively coupled to the DCTS 104 through a network 120.

In one implementation, the network 120 may be a wireless network, a wired network or a combination thereof. The network 120 may be implemented as one of the different types of networks, such as intranet, local area network (LAN), wide area network (WAN), the internet, and the like. The network 120 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 120 may include a variety of network devices, including routers, bridges, servers, computing devices, storage devices, and the like.

Further, the DCTS 104 may include a processing unit 124, a receiver unit 118, a memory unit 122, a transmitter unit 120 and the like. The processing unit 124 may be communicatively coupled to the receiver unit 118. The receiving unit 118 may be communicatively coupled to a developer device 102. The memory unit 122 may be communicatively coupled to the processing unit 124 and the receiver unit 118. The processing unit 124 may be coupled to the transmitter unit 120. Further, the processing unit 124 may be further communicatively coupled to an Application Program Interface (API) engine 116.

In one embodiment, the processing unit 124 may be implemented as one or more microprocessors, microcomputers, microcontrollers, digital signal processors, central processing units, state machines, logic circuitries, and/or any devices that manipulate signals based on operational instructions. Among other capabilities, the processing unit 124 may be configured to fetch and execute computer-readable instructions stored in the memory unit 122.

In one embodiment, the memory unit 122 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In one embodiment, the DCTS 104 may be deployed internally to an organization or shared as a service at a service provider cloud level. Further, different DCTS may optionally communicate with each other to synchronize already translated catalogs.

In one embodiment, the receiver unit 118 may be configured to receive a catalog in first language. The catalog may be received from the developer device 102. The catalog may be associated with an application in a cloud environment. In one example, the application may be a software application. The catalog in the first language may be stored at the memory unit 122.

Further, the receiver unit 118 may receive a request. The request may be received for the catalog in a second language. The request may be received from the user device 106 running the application. The request may comprise an application domain, an application ID, a catalog ID, the second language, a catalog version, and the like. In one example, the second language may be different from the first language.

Upon receiving the request, the processing unit 124 may dynamically generate the catalog in the second language. The catalog may be generated in real-time or near real-time of running the application at the user device 106.

In one embodiment, the processing unit 124 may be configured to identify at least one message of the catalog. Further, the processing unit 124 may analyse the at least one message of the catalog. Based on the analysis, a key-value pair of the at least one message may be identified. The key-value pair may comprise a key indicating a sign of the application and a value indicating a language type of the key. Based on the key-value par, the first language of the catalog may be determined.

Once the first language is determined, the processing unit 124 may publish the catalog in the first language. The publication of the catalog may correspond to publishing information associated with the application. The information may comprise an application domain, an application ID, an application language, a catalog ID, a catalog version, a function as publish, attributes associated with the application and the like.

Further, the processing unit 124 may transmit the catalog in the first language to the API engine 116. The processing unit 124 may further transmit the request for the catalog in the second language to the API engine 116. In one aspect, the API engine 116 may be configured to translate the catalog from the first language to the second language. The processing unit 124 may receive the catalog in the second language from the API engine 116. In one aspect, the catalog in the second language may be stored at the memory unit 122.

In one embodiment, the processing unit 124 may communicate with at least one other dynamic catalog translation system such as a dynamic catalog translation system-1 110, a dynamic catalog translation system-2 112 . . . , a dynamic catalog translation System-N 114 in order to synchronize pre-stored translated catalog s associated with the application. The pre-stored translated catalogs may comprise at least the catalog in the second language.

Once the catalog in the second language is generated, the transmitting unit 120 may communicate the catalog in the second language to the user device 106. Based on the communication, the application, running at the user device 106, may be executed in the second language.

In one embodiment, catalog in the second language may comprise one or more wrong translated messages. Further, the user device 106 may analyse the catalog in the second language. Further, the one or more wrong translated messages may be identified based on the analysis. The user associated with the user device 106 may update the one or more wrong translated messages. Based on updating the one or more wrong translated messages, the user device 106 may update the catalog in the second language. In one aspect, the updating of the catalog may correspond to correcting translation of one or more messages in the second language.

Further, the processing unit 124 may receive the updated catalog in the second language from the user device 106. Upon receiving the updated catalog, the processing unit may analyse the updated catalog in the second language. Based on the analysis, the processing unit 124 may update a global catalog in the second language. The global catalog may be updated with the corrected translation of the at least one message. Further, a global catalog version corresponding to the global catalog may be updated.

In one embodiment, the catalog associated with the application is translated from the first language to the second language. Based on the translation, the application may be available to the user in the second language. The translation of the catalog from the first language to the second language may be referred as an internationalization of the application. In other words, the internationalization may be defined as a process of creating the application such that it can be adapted in different languages in different regions.

Exemplary embodiments discussed above may provide certain advantages. Though not required to practice aspects of the disclosure, these advantages may include those provided by the following features.

Some embodiments of a dynamic catalog translation system configured to translate a catalog in real-time suggestions.

Some embodiments of the dynamic catalog translation system configured to update the catalog based on user inputs.

Some embodiments of the dynamic catalog translation system for internationalization of an application.

Figure 2:
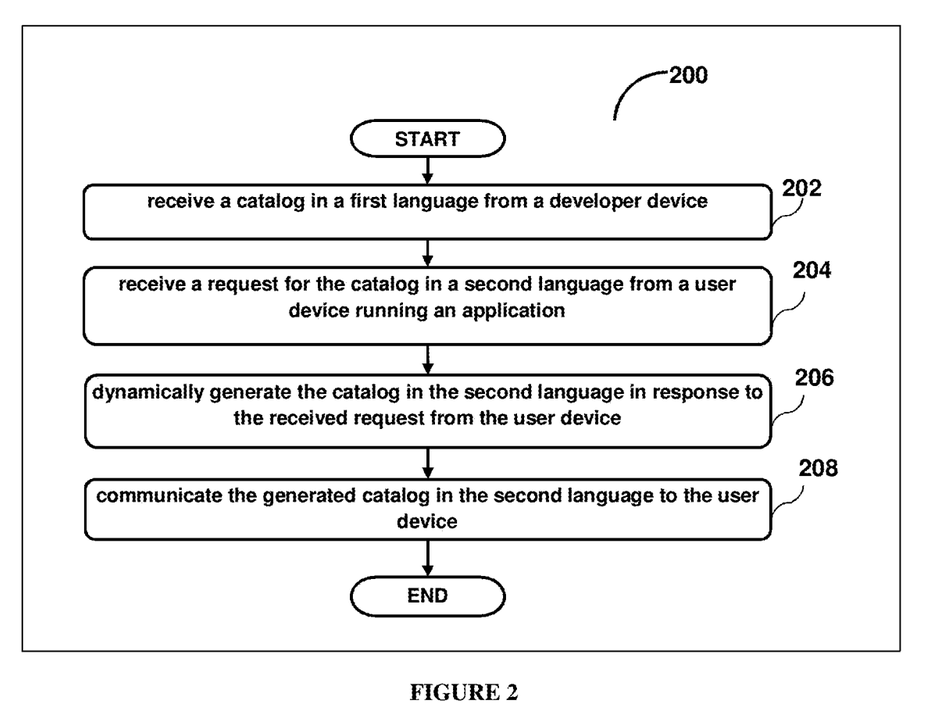
FIG. 2 illustrates a method in dynamic catalog translation system (DCTS) for internationalization of an application in a cloud environment, in accordance with an embodiment of the present subject matter.

Referring now to FIG. 2, a method 200 in a dynamic catalog translation system (DCTS) for internationalization of an application in a cloud environment, is disclosed in accordance with an embodiment of the present subject matter. The method 200 may be described in the general context of computer executable instructions. Generally, computer executable instructions can include routines, programs, objects, components, data structures, procedures, modules, functions, and the like, that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternate methods. Additionally, individual blocks may be deleted from the method 200 without departing from the spirit and scope of the subject matter described herein. Furthermore, the method 200 can be implemented in any suitable hardware, software, firmware, or combination thereof. However, for ease of explanation, in the embodiments described below, the method 200 may be considered to be implemented in the above described DCTS 104.

At block 202, a catalog in a first language may be received. In one implementation, the receiver unit 118 may receive the catalog. The catalog may be received from a developer device 102. The catalog may be associated with the application.

At block 204, a request for a catalog in a second language may be received. In one implementation, the receiver unit 118 may receive the request from a user device 106.

At block 206, the catalog in the second language may be generated dynamically. In one implementation, the processing unit 124 may generate the catalog in the second language. The catalog may be generated in real-time or near real-time of running the application.

At block 208, the catalog in the second language may be communicated to the user device 106. In one implementation, the transmitting unit 120 may communicate the catalog in the second language to the user device. Further, the application may be executed at the user device in the second language.

Figure 3:
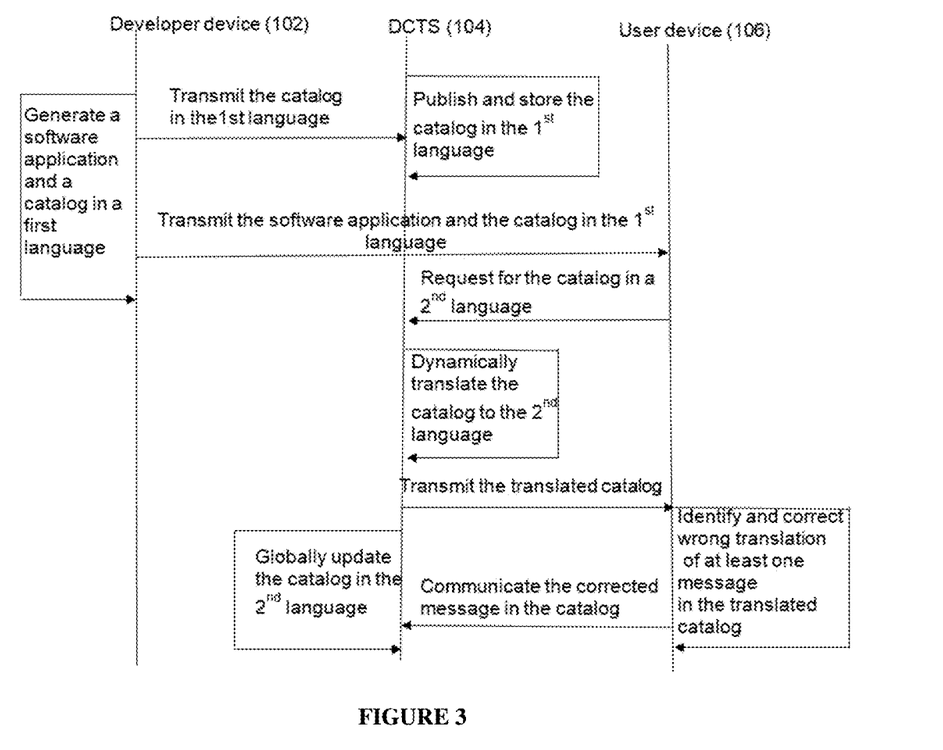
FIG. 3 illustrates a method for internationalization of the application in the cloud environment, in accordance with an embodiment of the present subject matter.

Referring now to FIG. 3, a method for internationalization of the application in the cloud environment is illustrated in accordance with an embodiment of the present subject matter. The method may comprise a Dynamic Catalog Translation System (DCTS) 104 communicatively coupled to a developer device 102 and a user device 106.

In one embodiment, the developer device 102 may generate the application and the catalog associated with the application. The catalog may generate in a first language. Further, the DCTS 104 may receive the catalog in the first language from the developer device 102. Once the catalog in the first language is received, the catalog in the first language may be published at the user device 106.

The DCTS 104 may further receive a request for the catalog in a second language from the user device 106. Based on the request, the DCTS 104 may generate the catalog in the second language in real-time. Upon generating the catalog in the second language, the DCTS 104 may communicate the catalog in the second language to the user device 106.

Further, the catalog in the second language may be further analysed at the user device 106. Based on the analysis, a wrong translation in at least one message in the catalog in the second language may be identified. Further, the wrong translation in the catalog in the second language may be corrected locally in the user device 106. Further, the corrected message in the catalog may be communicated to the DCTS 104. The user device 106 may communicate the corrected message to the DCTS 104. Upon receiving the corrected message, the DCTS 104 may globally update the catalog in the second language.

Figure 4:
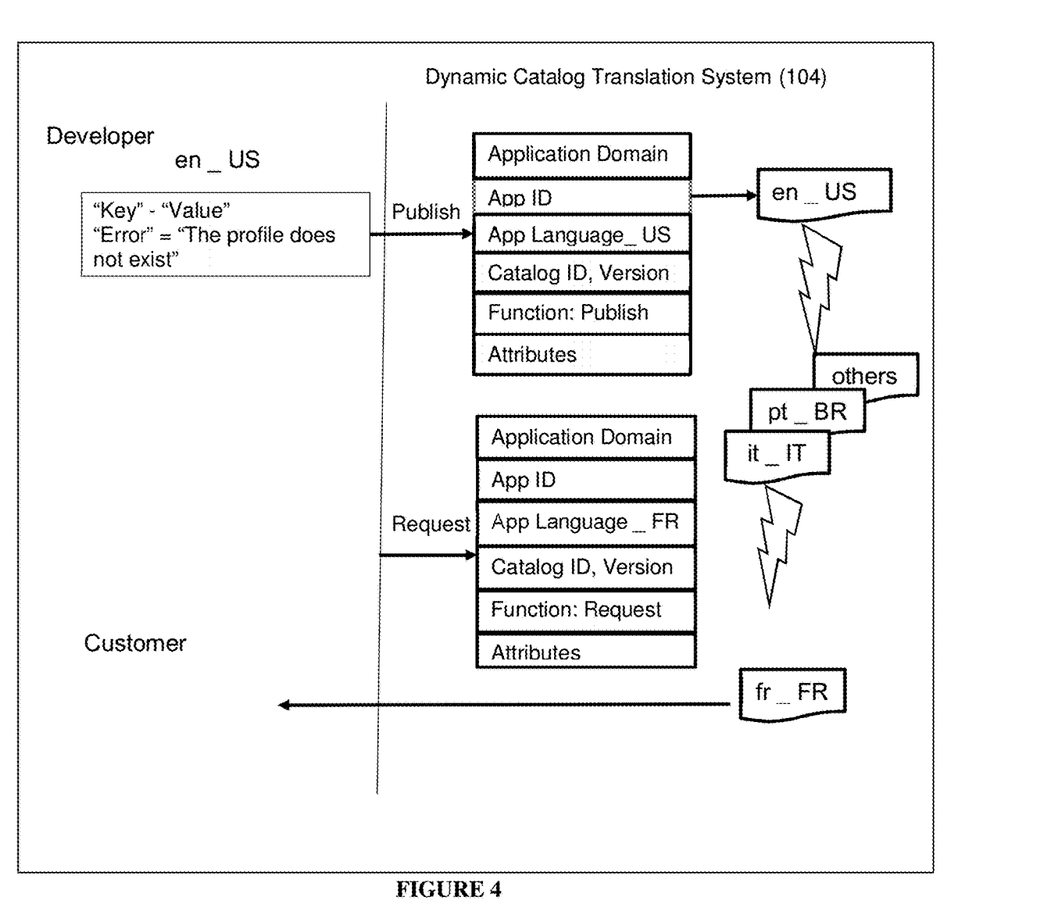
FIG. 4 illustrates an exemplary embodiment of internationalization of an application in a cloud environment, in accordance with an embodiment of the present subject matter.

Referring now to FIG. 4, an exemplary embodiment of internationalization of an application in a cloud environment is illustrated in accordance with an embodiment of the present subject matter. The application may be a software application. In one embodiment, at development time, a developer of the software application may generate a catalog in a single language. The catalog may be generated in a first language. The first language may be US English. Once the catalog associated with the software application is generated, the catalog may be published to the Dynamic Catalog Translation System (DCTS) 104. The Publication of the catalog may comprise publishing an App ID, an App language as US, a catalog ID and version, function as publish and other attributes related to the software application. In one aspect, the catalog in US English may be stored in a repository along with catalog s associated with other applications.

In one exemplary embodiment, a request for a catalog in French language may be received from a customer. The request may be received at application runtime. The request may comprise information such as Application domain, App ID, App language as French, a catalog ID and version, function as request and other attributes associated with the software application. Once the request is received, the DCTS 104 may check if the catalog in the French language exists in the repository or if it needs an update. If the catalog exists and it is at the latest level, there is still the possibility that the searched key is not available. In this case, the application site may request the DCTS 104 for a singular translation. It may cause a minor update of the catalog.

In one embodiment, the DCTS 104 provides the catalog translation leveraging either intrinsic or extrinsic translation function. In this case, if the translation is not accurate the proper interface may be provided to fine tune the message. The functions may either be exploited by end users or by the DCTS providers.

Further, the DCTS 104 may provide the catalog in the French language to the customer. It may be possible that a wrong translated message is shown when using the application. The customer may update the wrong message locally specifying there is an error. Once the wrong message is updated by the customer, the DCTS 104 may receive a notification. Upon receiving the notification, the DCST 104 may analyse the change in the catalog. If the change is valid, the DCTS 104 may update a global catalog for that language and the change may be available for every user.

Although implementations for dynamic catalog translation system have been described, it is to be understood that the appended claims are not necessarily limited to the specific features or methods described. Rather, the specific features and methods are disclosed as examples of dynamic catalog translation system.

The invention claimed is:

1. A method in a dynamic catalog translation system (DCTS) for internationalization of an application in a cloud environment, the method comprising:
   receiving, by a processing unit, a catalog in a first language from a developer device, wherein the catalog is associated with an application;
   identifying, by the processing unit, at least one message of the catalog;
   identifying, by the processing unit, a key-value pair of the at least one message of the catalog, wherein the key-value pair comprises a key indicating a sign of the application and a value indicating a language type of the key;
   determining, by the processing unit, the first language of the catalog based on the key-value pair of the at least one message of the catalog;
   receiving, by the processing unit, a request for the catalog in a second language from a user device running the application;
   dynamically generating, by the processing unit, the catalog in the second language in response to the received request from the user device, wherein the catalog is generated in a real-time or a near real-time of running the application at the user device;
   determining, by the processing unit, an absence of a searched key in the catalog in the second language;
   dynamically generating, by the processing unit and upon determining the absence of the searched key, an updated catalog in the second language based on a singular translation of the catalog in the second language; and
   communicating, by the processing unit, the generated or the updated catalog in the second language to the user device.

2. The method as claimed in claim 1, further comprising: publishing the catalog in the determined first language.

3. The method as claimed in claim 1, wherein the key value pair further comprises a value indicating a language type of the key.

4. The method as claimed in claim 1, further comprises executing the application on the user device in the second language based on the generated or the updated catalog, thereby providing internationalization of the application in the cloud environment.

5. The method as claimed in claim 1, wherein dynamically generating the catalog in the second language comprises:
   transmitting the catalog in the first language to an application program interface (API) engine;
   transmitting the request for catalog in the second language to the API engine; and receiving the catalog in the second language translated by the API engine, in response to transmitting the catalog in the first language and the request for catalog in the second language.

6. The method as claimed in claim 1, wherein dynamically generating the catalog in the second language comprises communicating with at least one other dynamic catalog translation system to synchronize pre-stored translated catalogs associated with the application, wherein the pre-stored translated catalogs comprise at least the catalog in the second language.

7. The method as claimed in claim 1, wherein communicating the generated or the updated catalog in the second language to the user device comprises:
   transmitting the generated or the updated catalog in the second language to the user device;
   receiving a further updated catalog in the second language from the user device, wherein the further updated catalog includes corrected translation of at least one message of the generated or the updated catalog in the second language; and
   updating a global catalog and corresponding global catalog version in the second language with the corrected translation of at least one message.

8. A dynamic catalog translation system for internationalization of an application in a cloud environment, the dynamic catalog translation system comprising:
   a processor; and
   a non-transitory memory communicatively coupled to the processor, wherein the non-transitory memory stores processor-executable instructions, which, on execution, causes the processor to:
   receive a catalog in a first language from a developer device, wherein the catalog is associated with an application;
   identifying at least one message of the catalog;
   identifying a key-value pair of the at least one message of the catalog, wherein the key value pair comprises a key indicating a sign of the application and a value indicating a language type of the key;
   determining the first language of the catalog based on the key-value pair of the at least one message of the catalog;
   receive a request for the catalog in a second language from a user device running the application;
   dynamically generate the catalog in the second language in response to the received request from the user, wherein the catalog is generated in a real-time or a near real-time of running the application at the user device;
   determine an absence of a searched key in the catalog in the second language;
   dynamically generate, upon determining the absence of the searched key, an updated catalog in the second language based on a singular translation of the catalog in the second language; and
   communicate the generated or the updated catalog in the second language to the user device.

9. The dynamic catalog translation system as claimed in claim 8, wherein the processor-executable instructions, on execution, further causes the processor to:
   store the catalog in the first language received from the developer device; and
   store the generated catalog or the updated catalog in the second language received from the processor.

10. The dynamic catalog translation system as claimed in claim 8, wherein the processor-executable instructions, on execution, further causes the processor to publish the catalog in the determined first language.

11. The dynamic catalog translation system as claimed in claim 8, wherein
   the key-value pair further comprises a value indicating a language type of the key.

12. The dynamic catalog translation system as claimed in claim 8, wherein the processor-executable instructions, on execution, further causes the processor to execute the application on the user device in the second language based on the generated or the updated catalog, thereby providing internationalization of the application in the cloud environment.

13. The dynamic catalog translation system as claimed in claim 8, wherein the processor is communicatively coupled to an application program interface (API) engine, and wherein the processor-executable instructions, on execution, causes the processor to dynamically generate the catalog in the second language by:
   transmitting the catalog in the first language to the API engine;
   transmitting the request for catalog in the second language to the API engine; and
   receiving the catalog in the second language translated by the API engine, in response to transmitting the catalog in the first language and the request for catalog in the second language.

14. The dynamic catalog translation system as claimed in claim 8, wherein the processor-executable instructions, on execution, causes the processor to dynamically generate the catalog in the second language by communicating with at least one other dynamic catalog translation system to synchronize pre-stored translated catalogs associated with the application, wherein the pre-stored translated catalogs comprise at least the catalog in the second language.

15. The dynamic catalog translation system as claimed in claim 8, wherein the processor-executable instructions, on execution, further causes the processor to communicate the generated or the updated catalog in the second language to the user device by:
   transmitting the generated or the updated catalog in the second language to the user device;
   receiving a further updated catalog in the second language from the user device, wherein the further updated catalog includes corrected translation of at least one message of the generated or the updated catalog in the second language; and
   updating a global catalog and corresponding global catalog version in the second language with the corrected translation of at least one message.

16. A method for internationalization of an application in a cloud environment, the method comprising:
   generating, by a developer device, an application and a catalog in a first language, wherein the catalog is associated with the application;
   receiving, by a dynamic catalog translation system, the catalog in the first language from the developer device;
   identifying, by the dynamic catalog translation system, at least one message of the catalog, wherein the at least one message is associated with a key-value pair indicating a sign of the application a language type of the application and a value indicating a language type of the key;
   determining, by the dynamic catalog translation system, the first language of the catalog based on the key-value pair of the at least one message of the catalog;

receiving, by the dynamic catalog translation system, a request for the catalog in a second language from a user device running the application;

dynamically generating, by the dynamic catalog translation system, the catalog in the second language in response to the received request from the user, wherein the catalog is generated in a real-time or a near real-time of running the application at the user device;

determining, by the dynamic catalog translation system, an absence of a searched key in the catalog in the second language;

dynamically generating, by the dynamic catalog translation system and upon determining the absence of the searched key, an updated catalog in the second language based on a singular translation of the catalog in the second language;

communicating, by the dynamic catalog translation system, the generated or the updated catalog in the second language to the user device;

executing, by the user device, the application in the second language based on the generated or the updated catalog;

determining, by a user of the user device, a wrong translation of at least one message of the generated or the updated catalog in the second language when running the application in the second language;

updating, by the user device, a corrected translation of at least one message of the generated or the updated catalog;

communicating, by the user device, the corrected translation of at least one message of the generated or the updated catalog to the dynamic catalog translation system; and updating, by the dynamic catalog translation system, a global catalog in the second language with the corrected translation of at least one message.

17. The method as claimed in claim 16, wherein dynamically generating the catalog in the second language comprises communicating with at least one other dynamic catalog translation system to synchronize pre-stored translated catalogs associated with the application, wherein the pre-stored translated catalogs comprise at least the catalog in the second language.

18. The method as claimed in claim 16, wherein dynamically generating the catalog in the second language comprises:

transmitting the catalog in the first language to an application program interface (API) engine;

transmitting the request for catalog in the second language to the API engine; and receiving the catalog in the second language translated by the API engine, in response to transmitting the catalog in the first language and the request for catalog in the second language.

19. The method as claimed in claim 16, publishing the catalog in the determined first language.

* * * * *